United States Patent [19]
Schroeder

[11] Patent Number: 5,211,015
[45] Date of Patent: May 18, 1993

[54] HYDRAULIC CIRCUIT FOR LIMITING THE TORQUE OF A HYDROSTATIC HYDRAULIC MOTOR CONNECTED IN CLOSED CIRCUIT TO A HYDRAULIC PUMP

[75] Inventor: Klaus Schroeder, Kirchdorf/Iller, Fed. Rep. of Germany

[73] Assignee: Liebherr-Werk Bischofshofen Ges.mbH, Bischofshofen, Fed. Rep. of Germany

[21] Appl. No.: 688,626

[22] PCT Filed: Oct. 15, 1990

[86] PCT No.: PCT/EP90/01746
§ 371 Date: Jun. 13, 1991
§ 102(e) Date: Jun. 13, 1991

[87] PCT Pub. No.: WO91/05966
PCT Pub. Date: May 2, 1991

[30] Foreign Application Priority Data

Oct. 17, 1989 [DE] Fed. Rep. of Germany ....... 3934641

[51] Int. Cl.$^5$ .............................................. F16D 31/02
[52] U.S. Cl. ........................................ 60/444; 60/468; 60/489; 60/493
[58] Field of Search ................. 60/444, 459, 460, 488, 60/489, 493, 464, 465, 468; 137/110

[56] References Cited

U.S. PATENT DOCUMENTS

| | | | |
|---|---|---|---|
| 3,748,859 | 7/1973 | Pruvot | 60/488 |
| 4,174,614 | 11/1979 | Dezelan | 60/445 |
| 4,382,360 | 5/1983 | Dummer | 60/468 |
| 4,531,369 | 7/1985 | Izumi et al. | 60/464 |
| 4,548,036 | 10/1985 | Matsuda et al. | 60/464 |
| 4,571,940 | 2/1986 | Wuchenauer | 60/465 |
| 4,571,941 | 2/1986 | Aoyagi et al. | 60/444 |
| 4,628,690 | 12/1986 | Arai et al. | 60/464 |

FOREIGN PATENT DOCUMENTS

| | | |
|---|---|---|
| 0301896 | 2/1989 | European Pat. Off. . |
| 1453426 | 2/1964 | Fed. Rep. of Germany . |
| 0184749 | 11/1982 | Japan ..................................... 60/444 |

Primary Examiner—Edward K. Look
Assistant Examiner—Hoang Nguyen
Attorney, Agent, or Firm—Morgan & Finnegan

[57] ABSTRACT

The invention refers to a hydraulic circuit for limiting the torque of a hydrostatic hydraulic motor connected in closed circuit to a hydraulic pump, which in braking mode operates as a hydraulic pump, in which pressure control valves are connected before and after the hydraulic motor. For the solution of this problem to develop such a hydraulic circuit which limits the maximum torque at the shaft of the hydraulic motor to approximately identical values independent of the fact whether the hydraulic motor is operated in the motor mode or in the pump mode, the pressure control valves consist of pilot-operated pressure control valves (6,7; 8,9). There is provided at least one on-off valve (5) which, when the hydraulic motor (2) is in the motor mode, switches the pilot-operated pressure control valve of the pressure side to a higher maximum pressure, and in pump mode it switches the pilot-operated pressure control valve of the other pressure side to a lower maximum pressure.

6 Claims, 4 Drawing Sheets

HYDRAULIC CIRCUIT FOR LIMITING THE TORQUE OF A HYDROSTATIC HYDRAULIC MOTOR CONNECTED IN CLOSED CIRCUIT TO A HYDRAULIC PUMP

FIELD OF THE INVENTION

The invention refers to a hydraulic circuit for limiting the torque of a hydrostatic hydraulic motor connected in closed circuit to a hydraulic pump according to the generic part of claim 1.

BACKGROUND

In such a circuit of a hydrostatic transmission with a closed circuit, for instance known from "Ölhydraulik lhydraulik", G. Bauer, 3rd edition 1982, B. G. Teubner Stuttgart, pressure control valves are provided which, when a certain pressure is exceeded, enable a bypass connection and thus a limitation of the torque of the hydraulic motor. The maximum limitation of the torque of a hydraulic motor is for instance necessary when a transmission is connected after the hydraulic motor. Said transmission can for instance be used for the drive of the wheels of a vehicle.

If the hydraulic motor is only used for driving a vehicle or another device with only one direction of rotation, the torque delivered by the engine in the accelerating phase and transmitted to the transmission can be limited in a simple manner by a corresponding design of the pressure control valve for the maximum permissible torque. Such a limitation is also then possible without any difficulties, when the hydraulic motor can be driven with both directions of rotation and can deliver power in both directions of rotation. In this case, the pressure line as well as the return line, which change their functions dependent on the direction of rotation, are to be secured by relief valves.

Hydrostatic hydraulic motors do not only operate as drive elements but very often they take over the function of engine brakes, when from the power take-off side a torque is transmitted via the transmission onto the engine, i.e. for instance when the amount of hydraulic oil supplied to the hydraulic motor corresponds to a torque of the engine which is less than the torque placed to the engine via the transmission, so that the hydraulic motor is operated as an engine brake in the pump mode. If, however, the hydraulic motor is operated as a pump in the braking mode, the return line becomes the pressure line in which a pressure can build up due to the securing by the pressure control valve, said pressure corresponding to the pressure in the supply line in the accelerating phase with maximum possible torque. Since, corresponding to its hydraulic efficiency, the hydraulic motor has losses during operation as motor as well as during operation as pump, the torque during pump mode at the engine shaft is much larger than during motor mode, when the pressure in the return line is of the same degree as during motor mode in the supply line. Thus, if the pressure in the return line during pump mode is limited by the relief valve to the same maximum pressure as during motor mode, due to the higher torque for instance the transmission will be overloaded. In order to render possible such an overload of the transmission without damaging it, said transmission is usually overdimensioned, in fact for instance by approximately 50 to 70 percent. Said overdimensioning of the drive parts does, however, lead to an increase in price of the vehicles or devices.

Therefore it is the object of the invention to develop a hydraulic circuit of the kind mentioned hereinbefore which limits the maximum torque at the shaft of the hydraulic motor to approximately identical values independent of the fact whether the hydraulic motor is operated in the motor mode or in the pump mode.

SUMMARY OF THE INVENTION

According to the invention this object is solved for a hydraulic circuit of the kind according to the generic type such that the pressure control valves consist of pilot-operated pressure control valves and that on-off valves are provided which, when the hydraulic motor is in the motor mode, switch the pilot-operated pressure control valve of the pressure side to a higher maximum pressure, and in pump mode they switch the pilot-operated pressure control valve of the other pressure side to a lower maximum pressure. Therein, the maximum pressure and the lower pressure, which are respectively settable by the pilot-operated pressure control valve, are dimensioned such that during motor mode of the hydraulic motor as well as during braking mode thereof in which the motor is operated as a pump, there is obtained at the engine shaft an approximately identically large torque.

A load-controlled relief valve for the protection of an engine is for instance known from DE-AS 14 53 426.

The hydraulic circuit according to the invention thus renders possible to operate the motor during motor mode with both directions of rotation and, nevertheless, to use the motor in both directions of rotation in the pump mode as engine brake, without an inpermissibly high torque being produced in the braking mode at the engine shaft. The two pressure stages of the pilot-operated pressure control valve are to be chosen corresponding to the efficiency of the hydraulic motor so that the pressures in the pressure lines are graduated with respect to each other during motor mode and during pump mode, such that for both modes of operation at the engine shaft an approximately identical torque is obtained.

In a further development of the invention it is provided that for the control of the pilot-operated pressure control valves, a hydraulic servo pump is provided the pressure side of which is connectable to one of the pilot-operated pressure control valves by a distributing valve. The distributing valve is switched such that during motor mode the pilot-operated pressure control valve associated with the supplying pressure is supplied with the pressure of the hydraulic servo pump so that said pilot-operated pressure control valve is switched to the higher maximum pressure. Viceversa, the pilot-operated pressure control valve arranged in the return line is switched to the lower pressure since the control line thereof is deareated so that during braking mode in said return line only a lower maximum pressure can be built up which limits the torque of the motor shaft driven from the transmission side to the same value as during motor mode.

Advantageously, the distributing valve is an electromagnetically operable four/two-way valve with an additional floating position.

In a further development of the invention there is provided that the hydraulic servo pump additionally controls an adjustment element for the hydraulic pump. Thereby, the hydraulic servo pump adjusts the power of the hydraulic pump to the required value in the motor mode and reduces it correspondingly in the braking mode.

According to a further inventive development it is provided that a throttle valve being switchable to a flowing-through position or a throttle position is provided in each pilot line of the pilot-operated pressure control valves, so that when there is a pressure increase in the pressure line the throttle valve switches to the throttle position so that the pressure control valve associated with the respective pressure line will be switched to the higher pressure stage with a predetermined time delay. Said development guarantees that no overloading of the transmission of for instance a vehicle can happen, when the hydraulic motor is switched to an opposite direction of rotation, (for instance, reversing), at a point of time at which it is still operated in the braking mode.

According to a further inventive development it is provided that distributing valves with a flowing-through position and blocking position are in the pilot lines of the pilot-operated pressure control valves, which distributing valves can be switched by means of feelers which detect the direction of transport of the hydraulic pump, the pressure in the supply lines and return lines of the hydraulic motor or the direction of rotation of the hydraulic motor.

BRIEF DESCRIPTION OF THE DRAWINGS

Embodiments of the invention will now be described in the following by means of the drawings. Therein it is shown in FIG. 1—a schematic connection diagram of the hydraulic circuit for limiting the torque of a hydrostatic hydraulic motor in a position in which the hydraulic motor can operate as a pump in both directions of rotation in a braking mode, FIG. 2—the circuit according to FIG. 1 in which the torque at the shaft of the hydraulic motor is limited to approximately the same size during motor mode and braking mode in one direction of rotation, FIG. 3—a further embodiment of the circuit according to FIG. 1 in which in case of a pressure increase in the supply line or return line a throttle valve is connected in the pertaining pilot line of the pilot-operated pressure control valve, and FIG. 4—a third embodiment of a connection diagram in which the pilot lines of the pilot-operated pressure control valves can be locked by on/off valves.

DETAILED DESCRIPTION OF THE INVENTION

Figure 1:
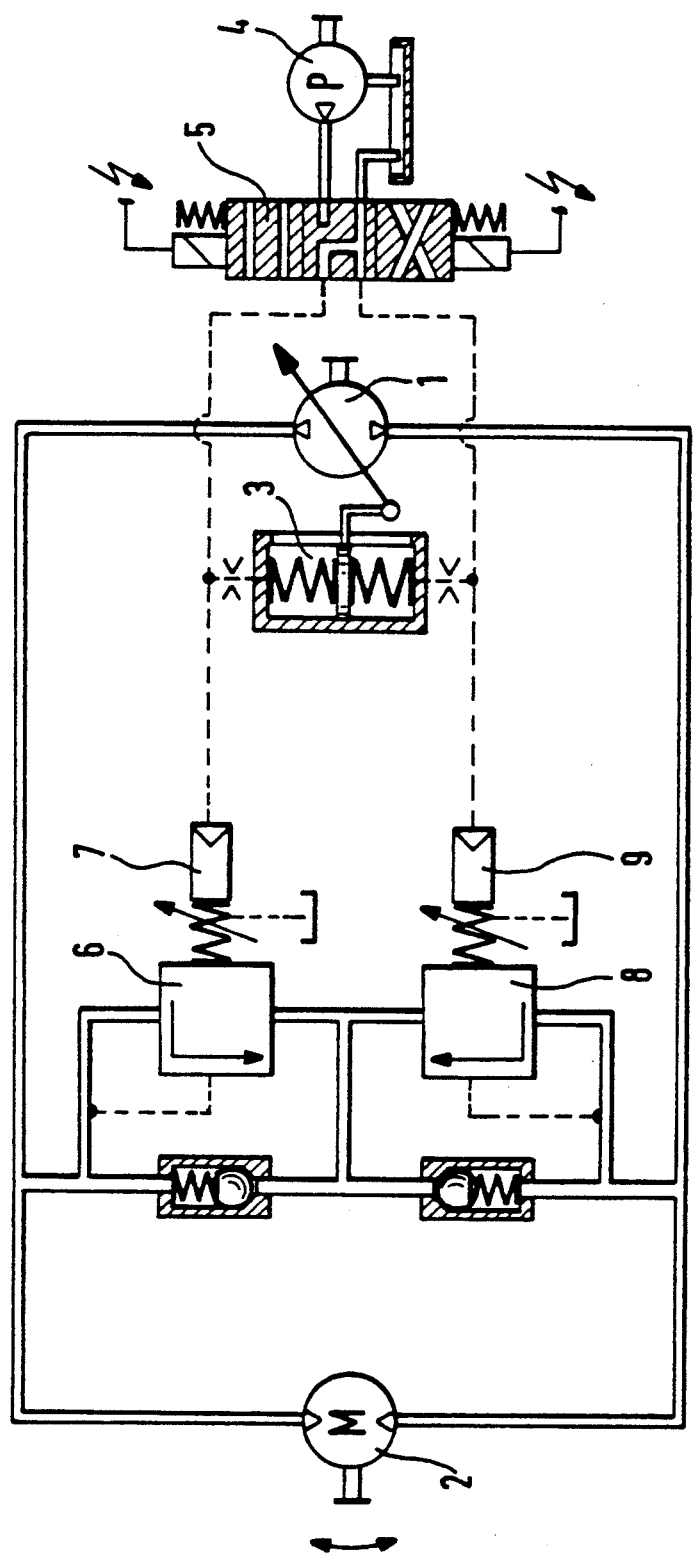

The hydraulic system of the connection diagramm according to FIG. 1 includes a hydraulic pump 1, provided with a reversable drive, and a hydraulic motor 2. Both form a hydrostatic drive. Due to the reversabiliy of the hydraulic pump 1, the hydraulic motor 2 can be put into motion from the standstill up to a maximum speed alternately in both directions, for the control of the transporting amount being provided an adjusting lever.

The hydraulic pump 1 is set by a control element 3. The hydraulic pressure required therefor is produced by a feed pump 4. A three-position valve 5 enables the switching of the pump 1 to the switching states "0 transporting amount", transport in the one direction, and transport in the other direction.

For the protection of the pump 1 and the hydraulic motor 2 there are installed pressure control valves 6 and 8 in the hydraulic circuit. Connecting valves 7 and 9 enable the operation of the pressure control valves 6 and 8 in two pressure stages.

Figure 2:
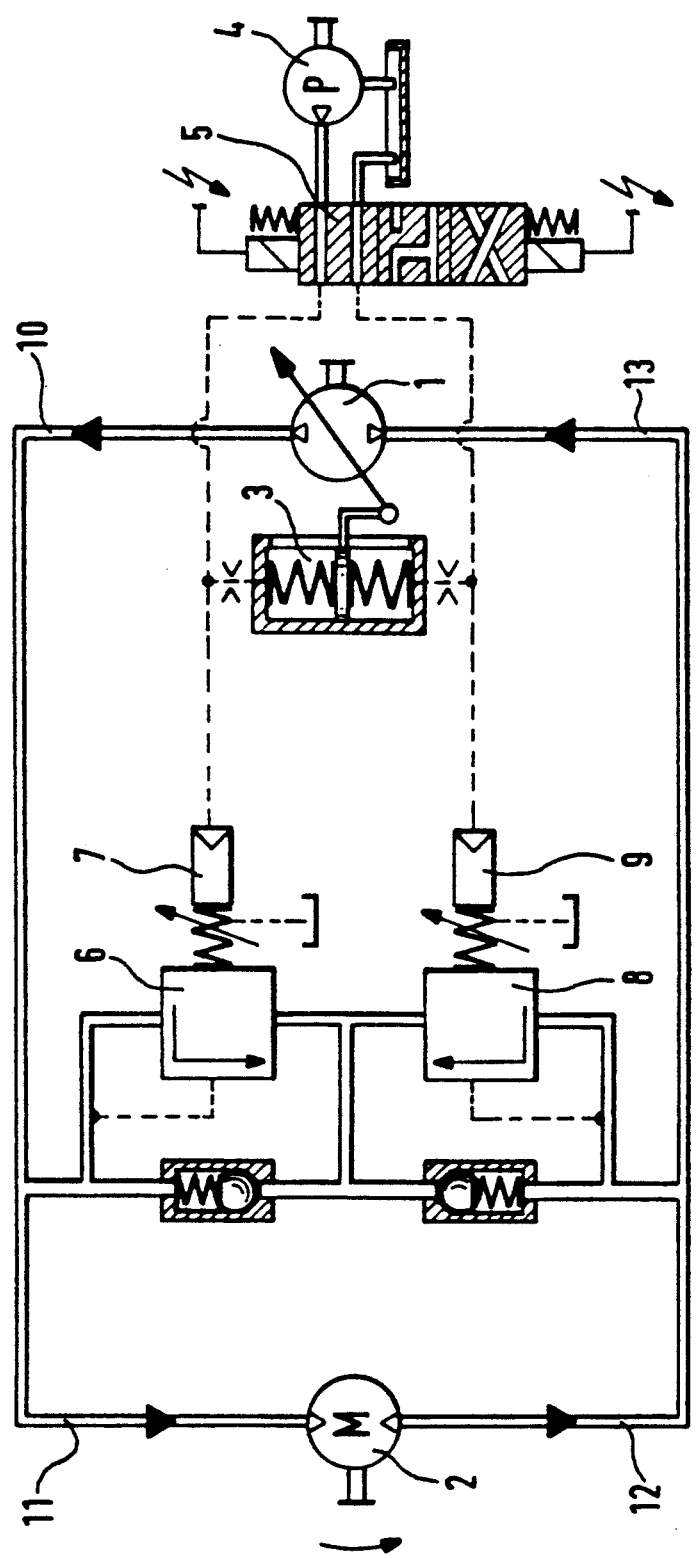

FIG. 2 shows the switching state in which the pump 1 transports hydraulic oil via the lines 10 and 11 to the hydraulic motor 2. When using said drive for instance in a vehicle, a high pressure is created in the lines 10 and 11 during a fast acceleration. The high pressure effects a high torque at the oil motor 2 and a direction of rotation which herein is for instance indicated as counter-clockwise. From the oil motor hydraulic oil flows at a low pressure via the lines 12 and 13 back to the pump 1. Not shown in this Figure is a feeder circuit compensating the oil leakage losses in the system.

In FIG. 2 the servo pump 4 transports control oil via the control valve 5 to the adjustment element 3 of the hydraulic pump 1. Simultaneously, however, the pressure connecting valve 7 is applied with the same control pressure. By the pressure connection of the valve 7 to the pressure control valve 6, the latter has the higher of two setting values. Said setting value limits the maximum starting torque at the oil motor 2.

For the retardation of the rotational movement of the oil motor 2 and thus of for instance a driven vehicle, the on-off valve 5 can be switched in its middle position according to FIG. 1. In said situation the oil motor 2 which is now driven by the vehicle as a pump transports hydraulic oil via the lines 12 and 13 to pump 1. The maximum operational pressure obtained by the pressure control valve 6 by connecting valve 7 has determined the maximum moment of the oil motor 2. Now a moment for the drive of the oil motor is required, whereby the vehicle is decelerated. Since for the dimensioning of the transmission the identically large torque at the oil motor is also to be provided in the deceleration phase, if possible, the hydraulic pressure developing in the lines 12 and 13 may not become as high as in the lines 10 and 11 during acceleration of the vehicle. This can be explained by the hydraulic mechanical efficiency of the oil motor which has losses when operated as motor as well as when operated as a pump.

Said losses are multiplied. For instance, with a hydraulic pressure of 450 bar in the lines 10 and 11 for the operation of the oil motor 2, a maximum torque of 650 N-m can be produced by the oil motor. When driving the oil motor with a torque of 650 N-m, the hydraulic pressure in the lines 12 and 13 can, however, only reach 290 bar.

For the protection of the transmission connected after the oil motor, it is therefore necessary that the pressure control valve 8 in its lowest pressure stage limit the maximum moment at the oil motor such that the oil motor, now driven by the wheels and the transmission, does not accept a higher torque than the transmission allows. This is ensured by the fact that in the switching position according to FIG. 1, as well as in the switching position according to FIG. 2, the pressure connecting valve 9 is unpressurizedly relieved to the tank, and thus the pressure control valve 8 only has the lower pressure stage. After deceleration of the vehicle to the standstill, by changing the switching of the control valve 5 to its lower switching position, the hydraulic motor can be accelerated in the opposite direction, wherein the function of the valves 6 and 8 as well as 7 and 9 is reversed. The effect is also the same in this direction of running.

Figure 3:
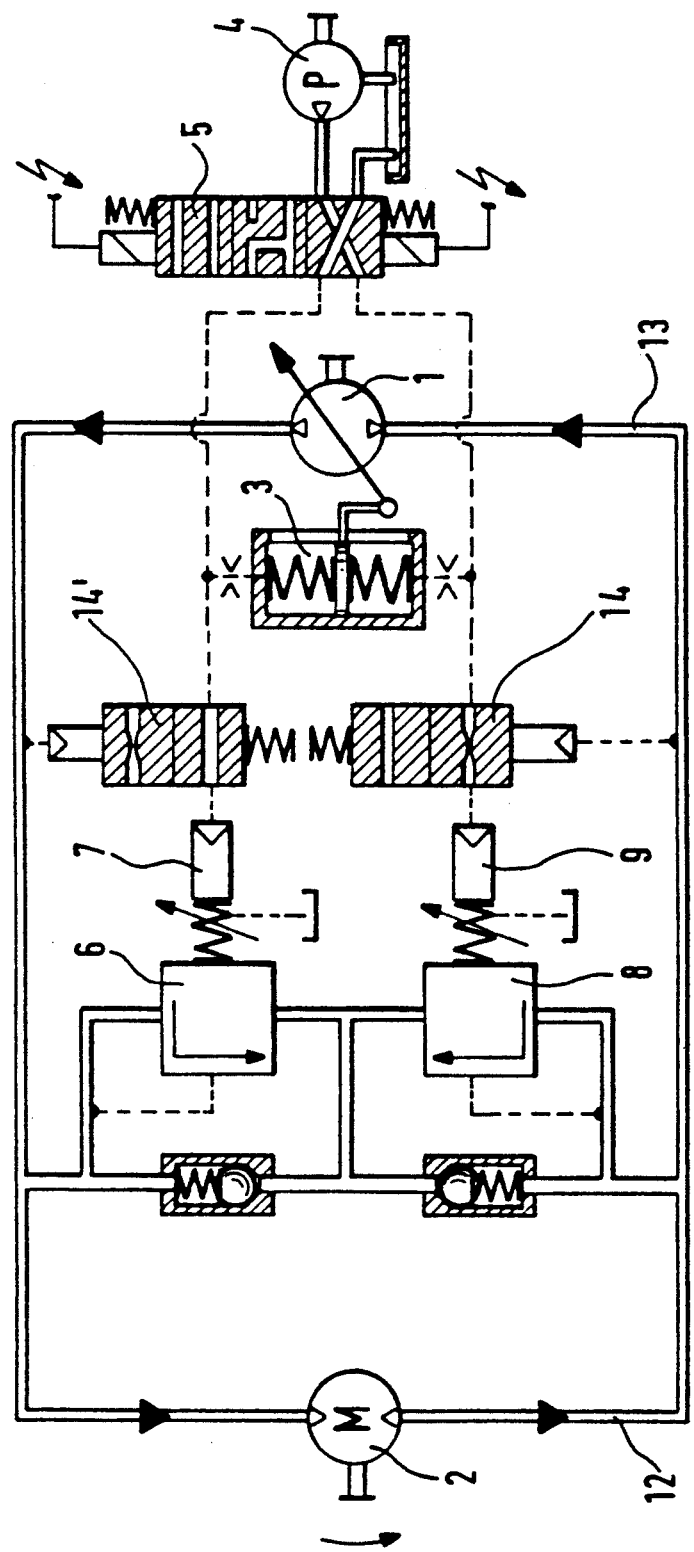

In a further embodiment of the invention according to FIG. 3, a securing against maloperation by the driver is to be carried out. In FIG. 3 there is represented that the transport direction of the pump and of the oil motor, as well as the direction of rotation of the oil motor is the same as in FIG. 2. The on-off valve 5, however, is already switched to opposite direction, since the driver of the vehicle has, for instance changed to reverse motion. In said phase, a too high pressure would occur in the lines 12 and 13, since by switching the on-off valve 5 to reversing, the pressure connecting valve 9 already is supplied with control pressure, although the oil motor 2 produces the hydraulic pressure in the lines 12 and 13 by deceleration of the vehicle in a forward running direction. As already stated, however, said pressure is not to exceed the maximum value of the set lower pressure to the pressure control valve 8. In FIG. 3 there is shown that a valve 14 was switched by the high pressure in the lines 12 and 13 in a throttled flowing-through position. Thereby, the servo pressure produced by the servo pump 4 can actuate the pressure connecting valve 9 only with a time delay. By a correct dimensioning of the throttle in valve 14, the circuit enables a braking of the vehicle without overloading the transmission connected after the oil motor 2. Valve 14' has the same function in the opposite running direction.

Figure 4:
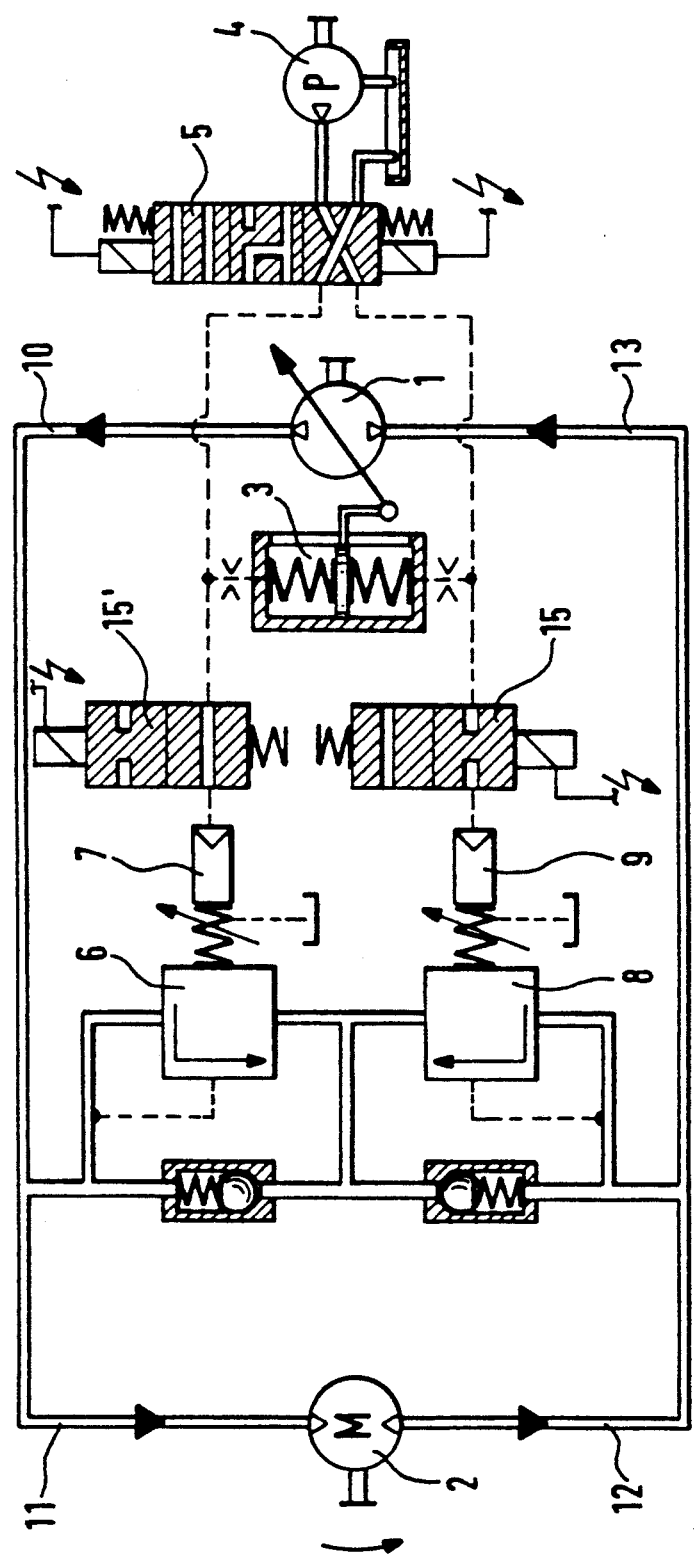

FIG. 4 shows a circuit which is to guarantee the protection of the transmission connected after the oil motor during intentional or unintentional switching of the on-off valve, also over a longer period of time. A position sensor at the pump control 3 of the pump 1 opens the locking valve 15 or 15' only when the transport direction of the pump corresponds to the switching direction chosen at the on-off valve 5. Only then the pump 2 drives the oil motor, and the pressure control valve 8 may be set to the higher pressure stage by means of the connecting valve 9. The sensor at the adjusting means of the pump 1 can also be replaced by a transport direction sensor in the lines 10, 11, 12 or 13. A further possibility for the control of the direction of rotation is the use of a rotational direction sensor at the oil motor 2. Since the direction of rotation of the oil motor 2 determines the direcon of running of e.g. a vehicle in use by the position of the on-off switch 5 it can be exactly determined whether there is an acceleration or a deceleration of the vehicle.

Acceleration of the vehicle means a high pressure stage of the pressure control valves 6 and 8. Deceleration of the vehicle means a lower pressure stage at the pressure control valves 6 and 8.

By the use of said safety circuit enormous costs for the development of the transmission and downstream connected driving units can be saved, since the up to now necessary over-dimensioning of said driving means was between 50 to 70 percent. Therein, the assumed efficiency for the oil motor is about 80 percent.

I claim:

1. A hydralic circuit for limiting the torque of a hydrostatic hydraulic motor, said hydraulic motor connected in closed circuit to a hydraulic pump, said hydraulic motor operating in the braking mode as a hydraulic pump, with pressure control valves being connected before and after the hydraulic motor, characterized in that the pressure control valves consist of pilot-operated pressure control valves (6, 7, 8, 9) having a first pressure side and an opposed pressure side and that at least one distributing valve (5) is provided which, when the hydraulic motor (2) is in said motor mode, switches the pilot-operated pressure control valve of the first pressure side to a higher maximum pressure and in the braking mode switches the pilot-operated pressure control valve of the opposed pressure side to a lower maximum pressure, further characterized in that a throttle valve (14, 14'), being swichable to a flowing-through position or to a throttle position, is provided in each of the pilot lines of the pilot-operated pressure control valves (6-9), so that when there is a pressure increase in pressure lines (11-13) provided in said hydraulic circuit the throttle valve switches to said throttle position so that the pilot-operated pressure control valve in cooperative relationship with a respective pressure line will be switched to the higher pressure stage with a predetermined time delay.

2. A hydralic circuit for limiting the torque of a hydrostatic hydraulic motor, said hydraulic motor operable in a motor mode or in a braking mode, said hydraulic motor connected in closed circuit to a hydraulic pump, said hydraulic motor operating in the braking mode as a hydraulic pump, with pressure control valves being connected before and after the hydraulic motor, characterized in that the pressure control valves consist of pilot-operated pressure control valves (6, 7, 8, 9) having a first pressure side and an opposed pressure side and that at least one distributing valve (5) is provided which, when the hydraulic motor (2) is in said motor mode, switches the pilot-operated pressure control valve of the first pressure side to a higher maximum pressure and in the braking mode switches the pilot-operated pressure control valve of the opposed pressure side to a lower maximum pressure; said hydrualic circuit further characterized in that for the control of the pilot-operated pressure control valves (6-9), a hydraulic servo pump (4) is provided, said servo pump having a pressure side which is connectable by said distributing valve (5) to one of the pilot-operated pressure control valves; said hydraulic circuit further characterized in that a throttle valve (14, 14') being switchable to a flowing-through position or to a throttle position is provided in each of the pilot lines of the pilot-operated pressure control valves (6-9), so that when there is a pressure increase in pressure lines (11-13) provided in said hydraulic circuit the throttle valve switches to said throttle position so that the pilot-operated pressure control valve in cooperative relationship with the respective pressure line will be switched to the higher pressure stage with a predetermined time delay.

3. A hydralic circuit for limiting the torque of a hydrostatic hydraulic motor, said hydraulic motor operable in a motor mode or in a braking mode, said hydraulic motor connected in closed circuit to a hydraulic pump, said hydraulic motor operating in the braking mode as a hydraulic pump, with pressure control valves being connected before and after the hydraulic motor, characterized in that the pressure control valves consist of pilot-operated pressure control valves (6, 7, 8, 9) having a first pressure side and an opposed pressure side and that at least one distributing valve (5) is provided which, when the hydraulic motor (2) is in said motor mode, switches the pilot-operated pressure control valve of the first pressure side to a higher maximum pressure and in the braking mode switches the pilot-operated pressure control valve of the opposed pressure side to a lower maximum pressure; said hydrualic circuit further characterized in that for the control of the pilot-operated pressure control valves (6–9), a hydraulic servo pump (4) is provided, said servo pump having a pressure side which is connectable by said distributing valve (5) to one of the pilot-operated pressure control valves; said hydraulic circuit further characterized in that the distributing valve is an electromagnetically operable four/two-way valve with an additional floating position; said hydraulic circuit further characterized in that a throttle valve (14, 14') being switchable to a flowing-through position or to a throttle position is provided in each fo the pilot lines of the pilot-operated pressure control valves (6–9), so that when there is a pressure increase in pressure lines (11-13) provided in said hydraulic circuit the throttle valve switches to said throttle position so that the pilot-operated pressure control valve in cooperative relationship with the respective pressure line will be switched to the higher pressure stage with a predetermined time delay.

4. A hydralic circuit for limiting the torque of a hydrostatic hydraulic motor, said hydraulic motor operable in a motor mode or in a braking mode, said hydraulic motor connected in closed circuit to a hydraulic pump, said hydraulic motor operating in the braking mode as a hydraulic pump, with pressure control valves being connected before and after the hydraulic motor, characterized in
that the pressure control valves consist of pilooperated pressure control valves (6, 7, 8, 9) having a first pressure side and an opposed pressure side and that at least one distributing valve (5) is provided which, when the hydraulic motor (2) is in said motor mode, switches the pilot-operated pressure control valve of the first pressure side to a higher maximum pressure and in the braking mode switches the pilot-operated pressure control valve of the opposed pressure side to a lower maximum pressure; said hydrualic circuit further characterized in that the hydraulic servo pump (4) additionally controls an adjustment element (3) for the hydraulic pump; said hydraulic circuit further characterized in that a throttle valve (14,14') being switchable to a flowing-through position or to a throttle position is provided in each of the pilot lines of the pilot-operated pressure control valves (6–9), so that when there is a pressure increase in pressure lines (11-13) provided in said hydraulic circuit the throttle valve switches to said throttle position so that the pilot-operated pressure control valve in cooperative relationship with the respective pressure line will be switched to the higher pressure stage with a predetermined time delay.

5. A hydralic circuit for limiting the torque of a hydrostatic hydraulic motor, said hydraulic motor operable in a motor mode or in a braking mode, said hydraulic motor connected in closed circuit to a hydraulic pump, said hydraulic motor operating in the braking mode as a hydraulic pump, with pressure control valves being connected before and after the hydraulic motor, characterized in
that the pressure control valves consist of pilooperated pressure control valves (6, 7, 8, 9) having a first pressure side and an opposed pressure side and that at least one distributing valve (5) is provided which, when the hydraulic motor (2) is in said motor mode, switches the pilot-operated pressure control valve of the first pressure side to a higher maximum pressure and in the braking mode switches the pilot-operated pressure control valve of the opposed pressure side to a lower maximum pressure; said hydrualic circuit further characterized in that for the control of the pilot-operated pressure control valves (6–9), a hydraulic servo pump (4) is provided, said servo pump having a pressure side which is connectable by said distributing valve (5) to one of the pilot-operated pressure control valves; said hydraulic circuit further characterized in that the hydraulic servo pump (4) additionally controls an adjustment element (3) for the hydraulic pump (1), said hydrualic circuit further characterized in that a throttle (14, 14') being switchable to a flowing-through position or to a throttle position provided in each of the pilot lines of the pilot-operated pressure control valves (6–9), so that when there is a pressure increase in pressure lines (11-13) provided in said hydraulic circuit the throttle valve switches to said throttle position so that the pilot-operated pressure control valve in cooperative relationship with the respective pressure lines will be switched to the higher pressure stage with a predetermined time delay.

6. A hydralic circuit for limiting the torque of a hydrostatic hydraulic motor, said hydraulic motor operable in a motor mode or in a braking mode, said hydraulic motor connected in closed circuit to a hydraulic pump, said hydraulic motor operating in the braking mode as a hydraulic pump, with pressure control valves being connected before and after the hydraulic motor, characterized in
that the pressure control valves consist of pilooperated pressure control valves (6, 7, 8, 9) having a first pressure side and an opposed pressure side and that at least one distributing valve (5) is provided which, when the hydraulic motor (2) is in said motor mode, switches the pilot-operated pressure control valve of the first pressure side to a higher maximum pressure and in the braking mode switches the pilot-operated pressure control valve of the opposed pressure side to a lower maximum pressure; said hydrualic circuit further characterized in that for the control of the pilot-operated pressure control valves (6–9), a hydraulic servo pump (4) is provided, said servo pump having a pressure side which is connectable by said distributing valve (5) to one of the pilot-operated pressure control valves; said hydraulic circuit further characterized in that the distributing valve is an electromagnetically operable four/two-way valve with an additional floating position; said hydraulic circuit further characterized in that the hydraulic servo pump (4) additionally controls an adjustment element (3) for the hydraulic pump; said hydraulic circuit further characterized in that a throttle valve (14, 14') being switchable to a flowing-through position or to a throttle position is provided in each of the pilot lines of the pilot-operated pressure cotnrol valves (6–9), so that when there is a pressure increase in pressure lines (11-13) provided in said hydraulic circuit the throttle valve switches to said throttle position so that the pilot-operated pressure control valve in cooperative relationship with the respective pressure line will be switched to the higher pressure stage with a predetermined time delay.

* * * * *

UNITED STATES PATENT AND TRADEMARK OFFICE
CERTIFICATE OF CORRECTION

PATENT NO. : 5,211,015
DATED : May 18, 1993
INVENTOR(S) : Klaus Schroeder

It is certified that error appears in the above-indentified patent and that said Letters Patent is hereby corrected as shown below:

Col. 5, Claim 1, line 58, change "hydralic" to --hydraulic--;
line 59, before "said hydraulic" insert
--said hydraulic motor operable in a motor
mode or in a braking mode,--.

Col. 6, Claim 2, line 19, change "hydralic" to --hydraulic--;
line 37, change "hydrualic" to --hydraulic--.

Col. 6, Claim 3, line 55, change "hydralic" to --hydraulic--.

Col. 7, Claim 3, line 16, change "fo" to --of--.

Col. 7, Claim 4, line 26, change "hydralic" to --hydraulic--;
line 43, change "hydrualic" to --hydraulic--.

Col. 7, Claim 5, line 57, change "hydralic" to --hydraulic--

Col. 8, Claim 5, line 7, change "hydrualic" to --hydraulic--;
line 15, change "hydralic" to --hydraulic--.

Col. 8, Claim 6, line 27, change "hydralic" to --hydraulic--;
line 44, change "hydrualic" to --hydraulic--.

Signed and Sealed this

First Day of February, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,211,015
DATED : May 18, 1993
INVENTOR(S) : Klaus Schroeder

It is certified that error appears in the above-indentified patent and that said Letters Patent is hereby corrected as shown below:

On the title page, Item [73] Assignee, should read --Liebherr-Werk Bischofshofen Ges. mbH, Bischofshofen, Austria--.

Signed and Sealed this

Twenty-ninth Day of March, 1994

Attest:

BRUCE LEHMAN

*Attesting Officer*  Commissioner of Patents and Trademarks